US009449525B2

(12) United States Patent
Timbadia et al.

(10) Patent No.: US 9,449,525 B2
(45) Date of Patent: Sep. 20, 2016

(54) SYSTEMS AND METHODS FOR TESTING OVER A DISTRIBUTED NETWORK

(71) Applicant: Educational Testing Servce, Princeton, NJ (US)

(72) Inventors: Darshan Timbadia, East Windsor, NJ (US); Steve Henderschott, Lawrenceville, NJ (US); Kenneth H. Berger, Skillman, NJ (US)

(73) Assignee: Educational Testing Service, Princeton, NJ (US)

(*) Notice: Subject to any disclaimer, the term of this patent is extended or adjusted under 35 U.S.C. 154(b) by 382 days.

(21) Appl. No.: 14/022,298

(22) Filed: Sep. 10, 2013

(65) Prior Publication Data

US 2014/0030690 A1    Jan. 30, 2014

Related U.S. Application Data

(63) Continuation of application No. 10/712,938, filed on Nov. 13, 2003, now Pat. No. 8,554,129.

(60) Provisional application No. 60/425,740, filed on Nov. 13, 2002.

(51) Int. Cl.

| G09B 3/00 | (2006.01) |
|---|---|
| G09B 7/00 | (2006.01) |
| H04L 12/26 | (2006.01) |
| H04L 29/08 | (2006.01) |
| G09B 5/00 | (2006.01) |
| G09B 7/02 | (2006.01) |

(52) U.S. Cl.
CPC ............ *G09B 7/00* (2013.01); *H04L 12/2602* (2013.01); *H04L 43/00* (2013.01); *H04L 67/025* (2013.01); *G09B 5/00* (2013.01); *G09B 7/02* (2013.01); *H04L 43/10* (2013.01); *H04L 43/16* (2013.01); *Y10S 706/927* (2013.01)

(58) Field of Classification Search
CPC ............ G09B 7/02; G09B 7/00; G09B 5/00; Y10S 706/927
USPC ......... 434/350, 322, 362, 118, 353; 706/927
See application file for complete search history.

(56) References Cited

U.S. PATENT DOCUMENTS

| 5,565,316 A | 10/1996 | Kershaw et al. |
|---|---|---|
| 5,827,070 A | 10/1998 | Kershaw et al. |
| 5,890,911 A | 4/1999 | Griswold et al. |
| 5,915,973 A | 6/1999 | Hoehn-Saric et al. |
| 5,947,747 A | 9/1999 | Walker et al. |
| 6,000,945 A | 12/1999 | Sanchez-Lazer et al. |

(Continued)

OTHER PUBLICATIONS

On Tour Media Press Release; On Tour IntraLearn Delivers First Internet-based Training and Testing Solution for Online Certification; Nov. 16, 2008.

(Continued)

*Primary Examiner* — Jack Yip
(74) *Attorney, Agent, or Firm* — Jones Day (57) ABSTRACT

A computer-based testing system includes testing stations connected to a testing service center and backend via the Internet for providing testing services. The system is operable to perform state management to implement fault recovery due to a computing device failure while a test is being administered. The system is also operable to utilize multiple caching techniques for mitigating network latency while administering tests.

16 Claims, 6 Drawing Sheets

(56) References Cited

U.S. PATENT DOCUMENTS

| | | |
|---|---|---|
| 6,014,760 A | 1/2000 | Silva et al. |
| 6,112,049 A | 8/2000 | Sonnenfeld |
| 6,112,051 A | 8/2000 | De Almeda |
| 6,208,832 B1 | 3/2001 | Remschel |
| 6,212,564 B1 | 4/2001 | Harter et al. |
| 6,282,404 B1 | 8/2001 | Linton |
| 6,301,571 B1 | 10/2001 | Tatsuoka |
| 6,315,572 B1 | 11/2001 | Owens et al. |
| 6,370,355 B1 | 4/2002 | Ceretta et al. |
| 6,381,444 B1 | 4/2002 | Aggarwal et al. |
| 6,413,100 B1 | 7/2002 | Dickmeyer et al. |
| 6,431,875 B1 | 8/2002 | Elliott et al. |
| 6,442,370 B1 | 8/2002 | Driscoll et al. |
| 6,513,042 B1 | 1/2003 | Anderson et al. |
| 6,633,742 B1 * | 10/2003 | Turner ............ G09B 5/00 434/350 |
| 6,669,481 B2 * | 12/2003 | Winter ............ A61B 5/16 128/897 |
| 7,099,620 B2 | 8/2006 | Miller |
| 2001/0031457 A1 | 10/2001 | Pfenninger et al. |
| 2002/0045155 A1 | 4/2002 | Sugimoto |
| 2002/0083118 A1 * | 6/2002 | Sim ............ G06F 17/30194 718/105 |
| 2002/0119433 A1 | 8/2002 | Callender |
| 2002/0160347 A1 * | 10/2002 | Wallace ............ G09B 7/06 434/322 |
| 2003/0152904 A1 * | 8/2003 | Doty, Jr. ............ G09B 7/00 434/350 |
| 2003/0203342 A1 | 10/2003 | Bowers |
| 2004/0058306 A1 * | 3/2004 | Wiig ............ A61B 5/16 434/362 |
| 2004/0229199 A1 | 11/2004 | Ashley et al. |
| 2005/0095571 A1 * | 5/2005 | Miller ............ G09B 7/02 434/350 |

OTHER PUBLICATIONS

On Tour Multimedia Inc.; IntraLearn Web-based Certification Training and Management System, Administrator Guide; 1998.
On Tour Multimedia, Inc.; IntraLearn Web-based Certification Training and Management System, Student Manual; 1998.

* cited by examiner

| ANSWER CHOICE | NEXT QUESTION(S) PRESENTED |
|---|---|
| A | 1,2 |
| B | 3 |
| C | 4-6 |
| D | 7 |

SYSTEMS AND METHODS FOR TESTING OVER A DISTRIBUTED NETWORK

CROSS-REFERENCE TO RELATED APPLICATIONS

This patent application is a continuation of U.S. patent application Ser. No. 10/712,938, filed Nov. 13, 2003, and entitled "Systems and Methods for Testing Over a Distributed Network," which claims priority to U.S. Provisional Application No. 60/425,740, entitled "Computer-Based Testing System," filed Nov. 13, 2002, the entirety of both of which is herein incorporated by reference.

BACKGROUND OF THE INVENTION

For many years, standardized tests have been administered to examinees for various reasons, such as for educational testing or for evaluating particular skills. For example, academic skills tests (e.g., SATs, GREs, LSATs, GMATs, etc.) are typically administered to a large number of students. Results of these tests are used by colleges, universities and other educational institutions as a factor in determining whether an examinee should be admitted to study at that educational institution. Other standardized testing is carried out to determine whether or not an individual has attained a specified level of knowledge or mastery of a given subject.

Traditionally, standardized tests have been paper-based, whereby examinees are gathered in a room and given paper test materials, usually comprising a question booklet and an answer sheet that is computer-readable by optical or magnetic means. With the growth of the computer industry and the reduction in price of computing equipment, fields in which information has traditionally been distributed on paper have begun to convert to electronic information distribution means. The field of standardized testing is no exception. A modestly-priced computer system can be used in place of a paper test booklet to administer test questions to a user. The use of computer systems to deliver test questions to users is generically described as "computer based testing" (CBT). One system for computer-based testing is described in U.S. Pat. No. 5,827,070 (Kershaw, et al.), which is commonly assigned to the assignee hereof and which is herein incorporated by reference in its entirety.

While systems for computer-based testing have been available, they have generally relied on outdated technologies, such as physical delivery of test questions and related software. While physical delivery of data and software on data storage media (e.g., on optical disk or magnetic tape) is reliable and secure, it is slow and cumbersome because it has a built in lag time (i.e., the time it takes to deliver the medium), and it requires a person to physically handle the delivery medium (i.e., to install the disk or mount the tape). While installation of initial testing materials on physical media may be acceptable, using physical media to provide recurring updates to the materials may, in some cases, be unacceptably cumbersome. With advances in networking, as exemplified by the growth in the capacity and usage of the Internet, network communication is quickly supplanting physical delivery in many contexts, and modem expectations demand no less than the speed that network communications can provide, while still retaining the security and reliability of physical delivery. In the testing context, the need to preserve security and reliability when introducing network distribution cannot be overemphasized.

SUMMARY OF THE INVENTION

A system and method for computer-based testing is disclosed wherein test information is prepared and stored at a central location and delivered via the Internet to one or more testing stations executing test taking software for administering a test. Test information includes test items, which includes test questions, examination identification & sequential information. The test taking software may be a JAVA application launched using the JNLP protocol, a JAVA applet, or any other software application. A JAVA application, unlike a JAVA applet, is not limited to the constraints of a browser and generally has better performance because the application is loaded on the testing station, and thus is the preferred embodiment of the test taking software. Also part of the preferred embodiment, the JAVA Network Launch Protocol (JNLP) protocol is used allowing the JAVA application to promptly retrieve a latest version of the application over the Internet. Also, a "keep-alive" connection is not required for communication via the Internet (e.g., HTTP/HTTPS protocols) between a testing station and a service center providing tests. The test information comprising the test items is stored only in volatile memory on the testing stations. The items are displayed to the test taker (also referred to herein as the user) and all user interaction with the testing station is transmitted to a central location and stored on a memory device.

In an embodiment of the invention, a cache list is created comprising a list of all test components which will be delivered to the testing stations and which are necessary to display the items to the user. Test components are used to create test items to be delivered to the user. The cache list is delivered to the testing station and synchronized with a central server. The testing station then pre-fetches a configurable number of components from the cache list. Upon the occurrence of certain pre-determined trigger events, additional cache components are delivered from the central server to the testing stations in order to eliminate data latency issues, which arise when components are fetched only at the instant they are needed for display.

In an alternate embodiment of the invention, information regarding the status and state of the examination on the testing station is recorded on a memory device accessible by the central server for fault recovery purposes. The central server records an initial state for the testing station, which initial states is determinable by the central server given identification of the examination being taken. The initial state is embodied in a data object which is delivered to the testing station and stored in volatile memory, allowing the state to be maintained on the testing station and mirrored on the central server. Thereafter, the testing station delivers changes to the state, which may comprise interactions by the user with the testing station and elapsed time, to the central server periodically and upon the occurrence of certain user actions.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to obscure unnecessarily the invention.

Before the present methods and systems are described, it is to be understood that this invention is not limited to the particular methodologies, protocols, or systems described, as these may vary. It is also to be understood that the terminology used in the description is for the purpose of describing the particular versions or embodiments only, and is not intended to limit the scope of the present invention which will be limited only by the appended claims. In particular, although the present invention is described in conjunction with Internet files, it will be appreciated that the present invention may find use in any network of one or more computers.

It must also be noted that as used herein and in the appended claims, the singular forms "a", "an", and "the" include plural reference unless the context clearly dictates otherwise. Thus, for example, reference to a "computer" or "server" is a reference to one or more computers or servers and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

The term "item," as used herein, refers to a test question preferably comprising a stem, a stimulus, responses, and directions, or some subset of those elements. These elements that comprise the test items are also known as test components. The concept of an "item," as it relates to the filed of testing is more fully discussed at column 1, lines 25-39 of U.S. Pat. No. 5,827,070 (Kershaw, et al.), which is incorporated by reference in its entirety.

Figure 1:
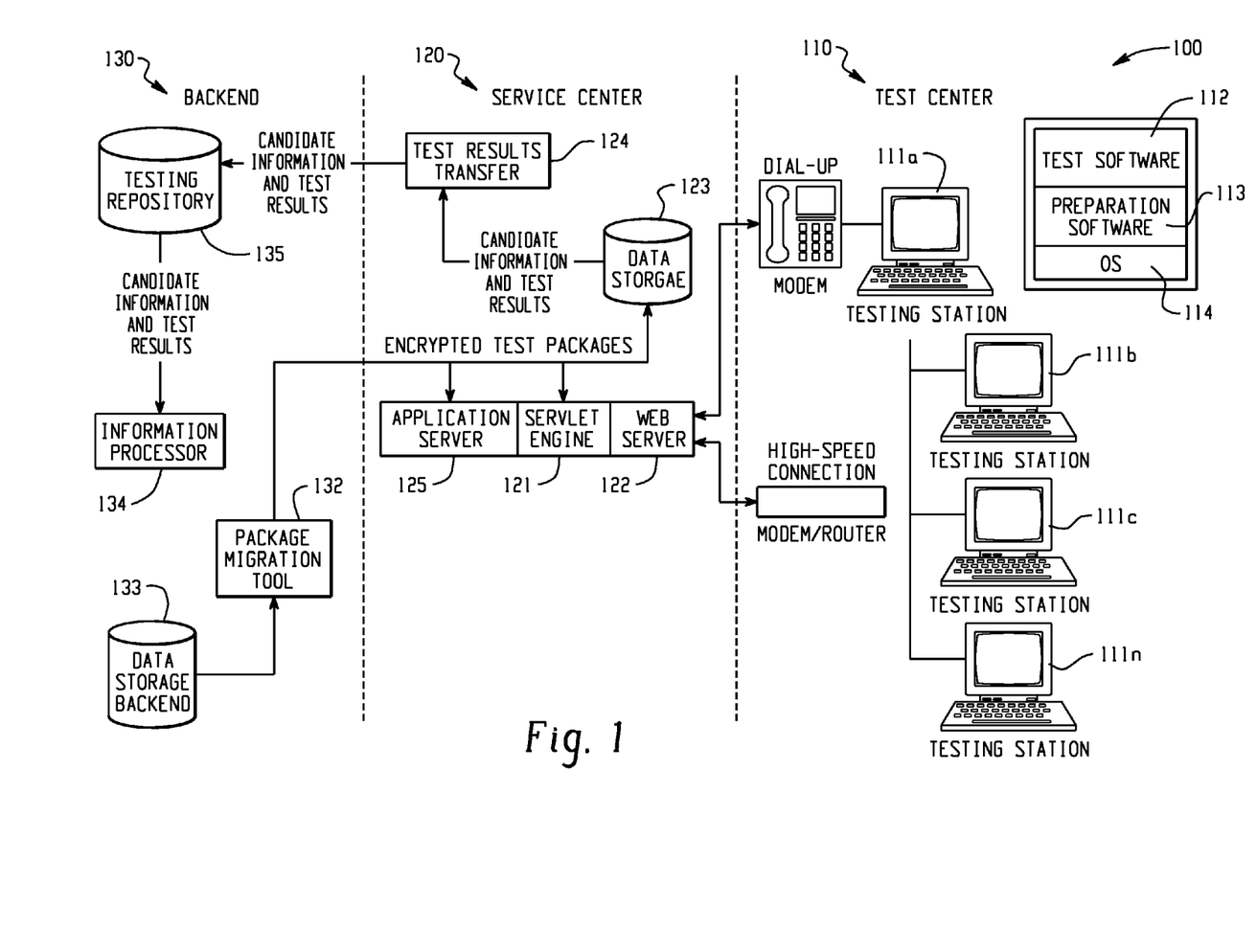
FIG. 1 illustrates an exemplary computer based testing system, according to an embodiment of the invention.

FIG. 1 illustrates a testing system 100, according to an embodiment of the invention. The system comprises test center 110 which comprises one or more testing stations 111a . . . n, in communication with a service center 120 which in turn is in communication with a service center backend 130. The test center 110 may be a location where one or more test takers gather to take an examination, a classroom, or the location of a test taker's personal computer. Further, although not shown in FIG. 1, it will be appreciated that one or more test centers 110 may be in communication with the service center 120 for the administration of a plurality of examinations. Communication between the test center 110, the service center 120, and the service center back end 130 may be by any data communication method including wireless communication, wire based communication, via a public telephone switched network (PTSN), or via one or more networks, such as the Internet, intranet, local area network, or a wide area network.

Test Center 110

In one embodiment, each of the testing stations 111a . . . n communicate via a network, such as a Local Area Network (LAN), Wide Area Network (WAN) or the Internet, with the service center 120. Other communication means may be used in whole or in part, including wireless communication, wire-based communication, a PTSN, and combinations thereof. A testing station 111a . . . n may communicate with the service center 120 using any protocol, such as JNLP or HTTP/HTTPS although a secure protocol such as JNLP is preferred. A connection between the testing station 111a . . . n and the service center 120 may be established only when necessary to exchange information rather than maintaining a continuous connection for the duration of the assessment. The connection between the test center 110 and the service center 120 may be implemented through a dial-up connection, a high-speed Internet connection or any other communication means including wireless communication.

Each testing station 111a . . . n is configured to execute environment preparation software 113 and test taking software 112 to administer a test to a user. The environment preparation software 113 executed by the testing station 111a . . . n will further configure each of the testing stations 111a . . . n to allow for delivery and administration of the test information in a secure environment by disabling the ability of the testing stations 111a . . . n to switch between the test taking software 112 and any other application or to exchange data between the test taking software 112 and any other application.

In one embodiment, the test taking software 112 is a JAVA application, which can be launched during the JNLP. The JAVA application may be used to administer a variety of test types. For example, the test taking software 112 may be used to administer so called linear tests, such as tests with predetermined questions, or so called adaptive tests, such as a test that generates questions based on a user's previous responses. The system 100 is adaptable to provide and administer examinations generated from any kind of model. The test taking software 112 is also operable to cache questions, such as described in detail below with respect to FIGS. 5 and 6 and to perform the other methods of the present invention.

The test taking software 112 may constitute a JAVA application not constrained by the limitations of a browser, such as its supported version of the JAVA runtime environment. Furthermore, in using JNLP the test taking software 112 may easily be updated. Alternately, the test taking software 112 may be implemented by way of an applet or any other software application configured to perform the methods described herein.

The testing stations 111a . . . n download test information for administering tests. As a security measure, test information is stored in volatile memory of the testing stations 111a . . . n and is erased after the completion of the test. In one embodiment, the test information is encapsulated in a JAVA Archive file (JAR) and held in the volatile memory of the testing station for use by the test taking software 112. Testing information comprises the identification of the examination, test items and test components.

The testing stations 111a . . . n may be located at the test center 110, where tests may be administered at a facility to multiple users. There is, however, no requirement that the testing stations 111a . . . n be physically in the same location.

Service Center 120

The service center 120 includes a web server 122 which is configured to receive data communications via any protocol, although preferably a secure protocol such as JNLP or HTTPS is used. In addition, a servlet engine 121 provides the communication framework and an application server 125 is configured to deliver data to the testing stations 111a . . . n in the administration of an examination and to receive data from the testing stations 111a . . . n. Although shown as separate components, the web server 122, the servlet engine 121, and the application server 125 may be physically separate components or combined into a single physical component.

The web server 122 is in communication with the testing stations 111a . . . n to provide access to the service center 120. The web server 122 is in further communication with a data storage device 123. The data storage device 123 is configured to store all data received from the testing stations 111a . . . n which information may comprise the user's responses to questions and any other interaction between the user and the testing station 111a . . . n. In addition, the data storage device 123 stores data necessary for fault recovery purposes in the event the testing station 111a . . . n fails or the network connection is broken. Fault recovery information may include a substantial mirror copy of the current state of a test being administered to user sufficient to allow fault recovery without reconstructing the state from stored information. State information may include test answers and elapsed testing time for a test currently being administered to a user, for example, on a testing station. The data storage device 123 also caches test information (e.g., test questions, etc.) received from the backend 130 and is further configured to store test items which may be delivered to and displayed on the testing stations 111a . . . n and information received from the testing stations 111a . . . n (e.g., test results, user identifying information, etc.) to be transmitted to the backend 130.

The application server 125 is configured to support the testing software 112 operating on the testing stations 111a . . . n. The application service 125 may receive requests from the testing stations 111a . . . n for data and appropriately respond to such requests. The application server 125 will control the delivery of test items and components to the testing stations 111a . . . n, and may provide services, for example an ENTERPRISE JAVA BEANS (EJB) container. Furthermore, data transmitted from the testing stations 111a . . . n is received via the web server 122 and is delivered to the data storage device 123.

Optionally, an administrator station (not shown) may be in communication with the application server 125. The administrator station may be remote from the service center 120, located at the service center 120, or included as one of the other components of the computer based testing system 100. The administrator station may be used to perform administrative functions for the test center 110, such as monitoring the testing stations 111a . . . n for failure, registering users, or printing test scores. The administrator station can also be configured to perform monitoring and other functions for the service center 120 such as load balancing, viewing tests and/or responses, monitoring communications with the testing stations 111a . . . n, or troubleshooting. In addition, the administrator station may be configured to perform similar functions for the backend 130.

The data received from the testing stations 111a . . . n may be transferred from the data storage device 123 to the back end 130 where such data may be subject to further processing, such as scoring, or archival storage. Such transfer may be accomplished by test results transfer module 124 that receives the user information and test results from the data storage device 123, and transfers such information and results to the back-end 130.

Backend 130

The data storage device 123 receives data from and delivers data to the backend 130. The backend 130 is the location at which the data received from the testing stations such as the user's information and test results are stored and at which the test information is prepared and packaged. In addition, the backend 130 stores the latest release of the test content (items) to be delivered to the data storage device 123. Test items are stored on a data storage backend device 133. In an embodiment of the invention, the test items are grouped together and stored on the data storage backend device 133 in the form of test packages. The test items are retrieved from the data storage backend device 133 and properly formatted for delivery to the data storage device 123 by the package migration tool 132. When test items are stored on the data storage backend device 133 in the form of test packages, the package migration tool 132 also manages the proper handling of subsequent versions of test packages to ensure that the proper version is being accessed from the data storage device 123. For example, test package A (Ver. 1) may be created on data storage device 133 and delivered by the package migration tool 132 to the data storage device 123. Subsequently test package A may then be updated as Ver. 2. When the package migration tool 132 delivers the Ver. 2 to the data storage device 123, it does so with an indicator that the prior version (i.e., Ver. 1) should be marked undeliverable and in response to requests for test package A, Ver. 2 should be provided. The package migration tool 132 may also perform encryption by any conventional encryption method, such as those based on symmetric key algorithms or public/private key algorithms.

Data received from the testing stations such as user information and test results are delivered from the service center 120 and stored in a test information repository 135. User information may include the user's name and address, and/or other information pertaining to the users who take tests, including, for example, identification of the test center 110. Test results may include information such as the user's responses to the various test items, the version of the test package taken, and date and time of examination. Optionally, the backend 130 may further comprise a test information processor 134. The test information processor 134 is configured to receive data from the test information repository 135 and process such data to generate desired reports and analysis. For example, the test information processor 134 may score the responses to the test items, may correlate the test results and user information and produce test score reports, statistical analysis, or other information related to the examination.

State Management

Importantly, the system 100 is configured to provide quick and effective recovery to the testing stations 111a . . . n in the event that one or more of the testing stations 111a . . . n fail during the examination and need to be restarted prior to the completion of an assessment. The present invention provides a method of providing for such recovery, called state management, which is configurable to the needs and requirements of each test and which will allow the user to restart his/her examination at substantially the same point in the examination that the testing station failed. This method requires that the test state as it exists on the testing stations 111a . . . n is mirrored on the data storage device 123. The test state data is a configurable set of data objects which describes the state of the testing stations 111a . . . n at a given point in the examination.

The test state data may comprise, for example, the elapsed test time, the current test item being administered, prior assessment items administered, and responses to prior test items. The elapsed test time may include an amount of test taking time that has elapsed from a starting time of a test being administered. The elapsed test time takes into consideration any amount of time that a test is unavailable to the user while the test is being administered. For example, portions of the test may be downloaded during administration of the test. Due to transmission latency, questions may not be available to the user. If the user is allotted a predetermined amount of time to take the test, the user will not be penalized for the time the questions are not available to the user. Also included in the test state data is the user's responses to prior test items. This includes any answer the user has entered.

Figure 2:
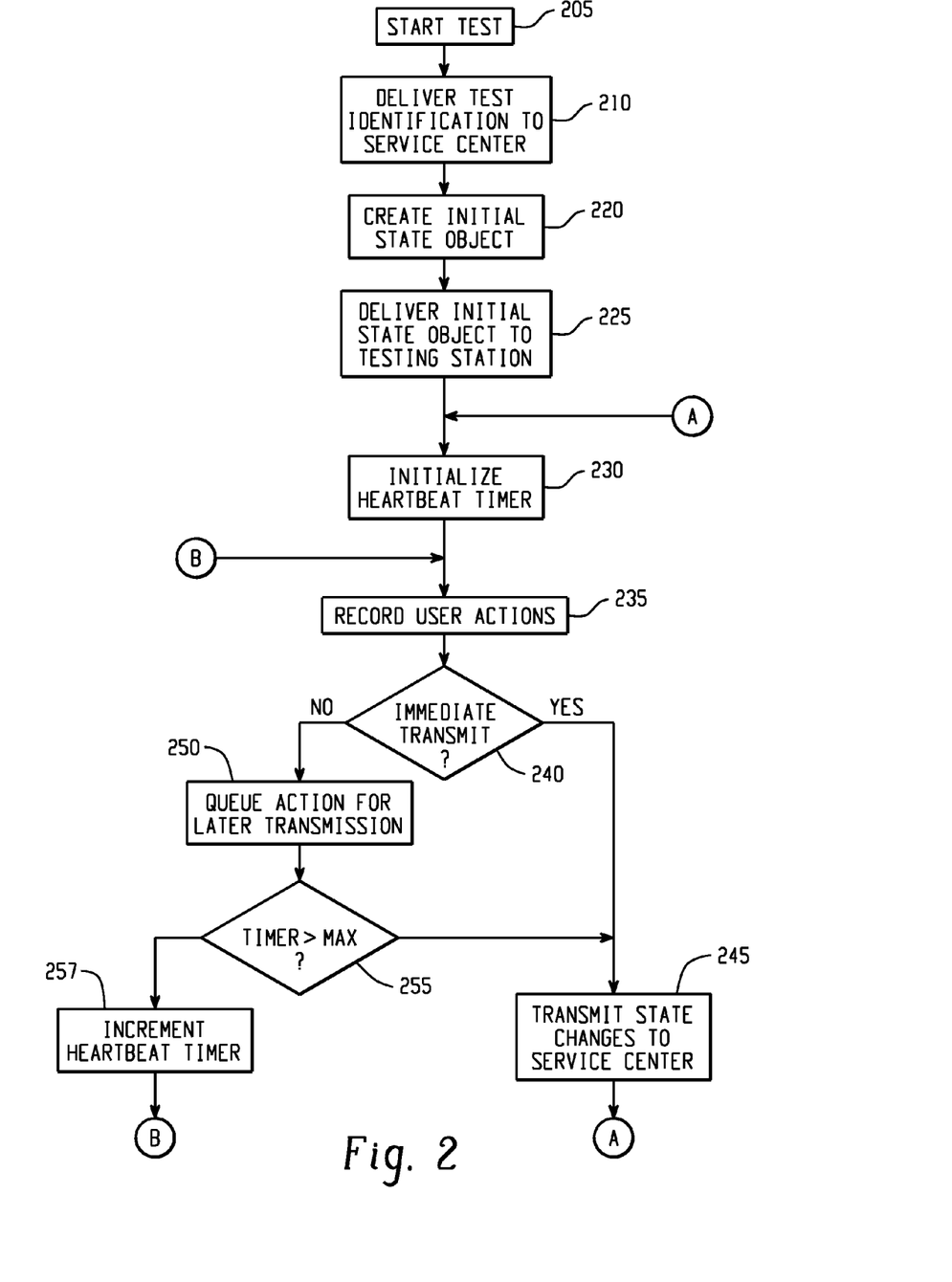
FIG. 2 illustrates a flow diagram of a method for performing state management at a testing station, according to an embodiment of the invention.

FIG. 2 illustrates the method for performing state management according to an embodiment of the invention. The method is initiated at the start of the test 205 on the testing station. The testing station transmits identification of the examination being administered to the service center 210. The service center then creates an initial state object for that examination 220 and stores the initial state object on a data storage device. The initial state object is delivered from the service center to the testing station 225. The state object includes identification of the examination being administered any may also comprise test items, test item response, lapsed time and any other information related to the taking of the examination. A heartbeat timer is then initialized 230 and each user interaction with the testing station is recorded 235. Next, the user interaction is checked to determine if it is one which has been predetermined to cause the state to be updated 240. The user interactions which may cause the state to be updated can be configured to meet the needs of a given examination and may include any interaction or only those which result in a response being made to the current test item being displayed. If the user interaction is one requiring the state to be updated, the testing station then transmits the changes to the state to the service center 245. Importantly, only the changes to the state are transmitted, not the entire state object. The changes to the state which are transmitted to the service center include not only the user interaction causing the transmission at step 245 but any other changes which may have occurred since the last transmission and the change in time. After the state object is updated with the changes in the state, the heartbeat timer is re-initialized 230

Alternatively, if the user interaction is not one which requires the state to be updated, the user interaction is queued for later transmission to the service center 250. The heartbeat timer is checked to determine if it has exceed a maximum value 255. The maximum value may be configured to any amount depending on the requirements of the examination. If the heartbeat timer has not exceeded its maximum value, then the heartbeat timer is incremented 257 and the method continues to record the user interactions 235. Otherwise, the transmission of changes in the state occurs at step 245.

Figure 3:
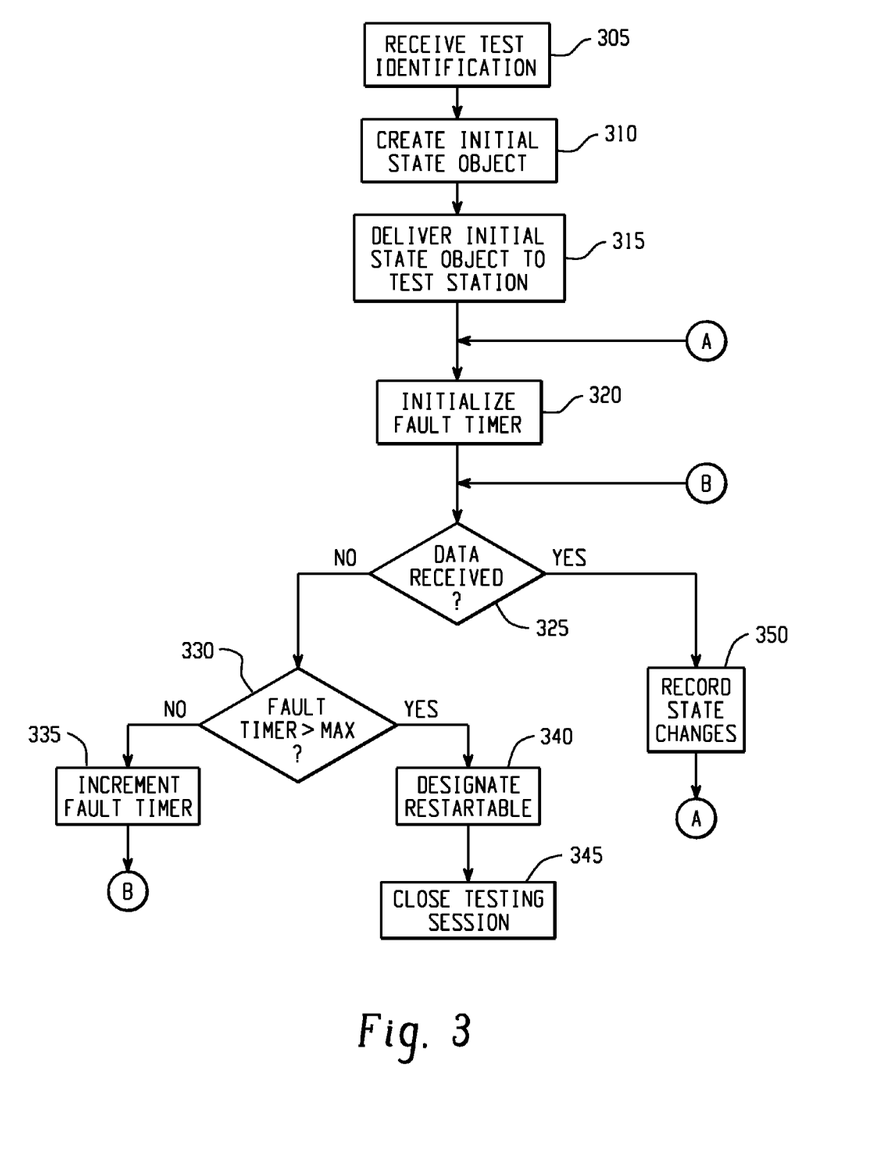
FIG. 3 illustrates a flow diagram of a method for performing state management at a service center, according to an embodiment of the invention.

FIG. 3 is a diagram illustrating a method for performing state management at the service center 120. The method commences with the receipt of a test identification 305 from a testing station. The service center then creates an initial state objection 310 and delivers the initial state object to the testing station 315. Next, a fault timer is initialized 320 and the service center awaits data from the testing station. If data is received 325, the changes to the state are recorded in a data storage device and the changes to the state are recorded 350. Alternatively, if data is not received 325, the fault timer is checked 330 to determine if the fault timer exceeds a maximum value. If the fault time does not exceed a maximum value, the fault timer is incremented 335 and the service center continues to await data from the testing station. If the fault timer does exceed the maximum value, the service center designates that testing session as restartable 340 and the testing session is closed 345.

The fault timer will exceed a maximum value only when it has not received data from the testing station for a time period sufficient to conclude that the testing station is no longer operable. When the user reconnects, on the same, or a different testing station, the service center will identify the examination being conducted on the testing station as the examination previously closed and designated restartable. Using the initial state and the changes to the initial state which have been recorded on the data storage device, the service center will recreate the examination on the testing station at the point when the testing station failed, within parameters configurable to meet the requirements of the examination.

Assessment Item Caching

The system 100 is operable to administer any type of examination including, but not limited to, linear tests and adaptive tests. For linear tests, the questions for the test are predetermined. However, instead of transmitting an entire test to a testing station, the service center 120 may transmit the test in portions during administration of the test using the method described herein. For example, one portion of the test may be transmitted to the testing station and stored in local volatile memory, such that a user can begin taking the test. As the test is being administered, additional portions of the test are continually transmitted to the testing station and stored in volatile memory. Events that may trigger transmission of a portion of the test can include the user answering a predetermined number of questions or elapse of a predetermined amount of time.

The package migration tool 132 can retrieve a test from the data storage backend 133. The package migration tool 132 may store the test in the data storage backend device 123. Then, the application server 125 transmits portions of the test to the testing station 111a . . . n as needed, via the servlet engine and the web server 122.

For the adaptive test, the next question presented to the user is not predetermined; rather, it is based on a user's responses to previous test questions. For adaptive tests, the service center 120 transmits a set of test items or questions to the testing station 111a . . . n administering the test. The test taking software 112, then selects one or more of the questions to display to the user based on the user's response to previous questions. The selected questions(s) are then presented to the user during the test to be answered. This process is repeated until completion of the test. The service center 120 may transmit the set of questions while the user is answering a question. Therefore, the user may not have to wait to read the next question.

The package migration tool 132 may retrieve a large number of questions from the data storage backend 133 and store the questions in the data storage device 123. The application server 125 may select a set of questions from the data storage device 123 in response to receiving a response from the testing station 111a . . . n. The set of questions is transmitted to the testing station 111a . . . n, whereby one or more of the questions in the set are presented/displayed to the user based on the user's response to previous question(s).

Figure 4:
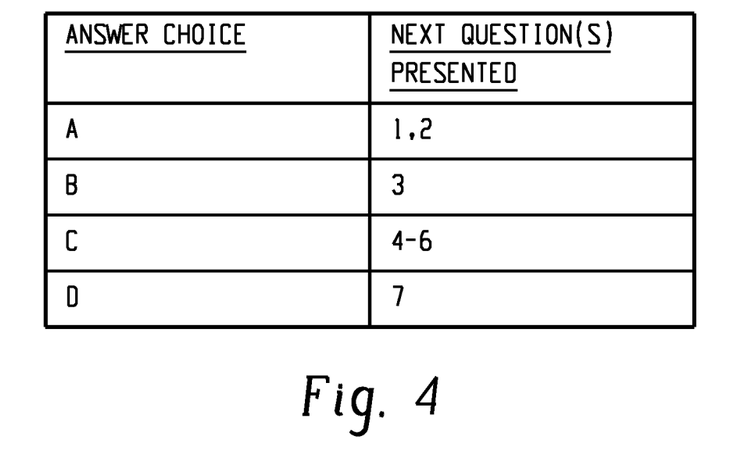
FIG. 4 illustrates a table for test information caching, according to an embodiment of the invention.

FIG. 4 illustrates an example of the correlation between a response and the next questions to be presented to the user in the administration of an adaptive test. The testing station 111a . . . n receives a set of seven questions, which are stored in volatile memory. If the user selects answer choice A to a question (e.g., question 10 in the test), then the test taking software selects questions 1 and 2 from the set and these questions are next presented to the user (e.g. as questions 11 and 12). If the user selects answer choice B, then question 3 is selected from the set to be next presented to the user. If the user selects answer choice C, then questions 4-6 are selected from the set. If the user selects answer choice D, then question 7 is selected from the set.

The test taking software 112 and the application server 125 together manage the implementation of an adaptive test item selection algorithm such as a "lookahead" function described in FIG. 4. Any adaptive test algorithm may be implemented on the application server 125 and the test taking software 112. It selects test questions to be retrieved from the service center and to be displayed to the user based on the response to previous questions. The application server 125 may employ a mechanism for "looking ahead" one or more items, in order to supply several questions to the testing stations 111a . . . n. For example, prior to receiving an answer to the current item, two potential sets of questions may be delivered to the testing station—one if the current item is answered correctly, and one if it is answered incorrectly. This is a lookahead algorithm for only one level of questions. The application may be configured to look further ahead and provide multiple levels of sets of questions if required to improve performance. Additionally, the application server may use an algorithm based on the answer choice selections such as the lookahead function described in FIG. 4.

Figure 5:
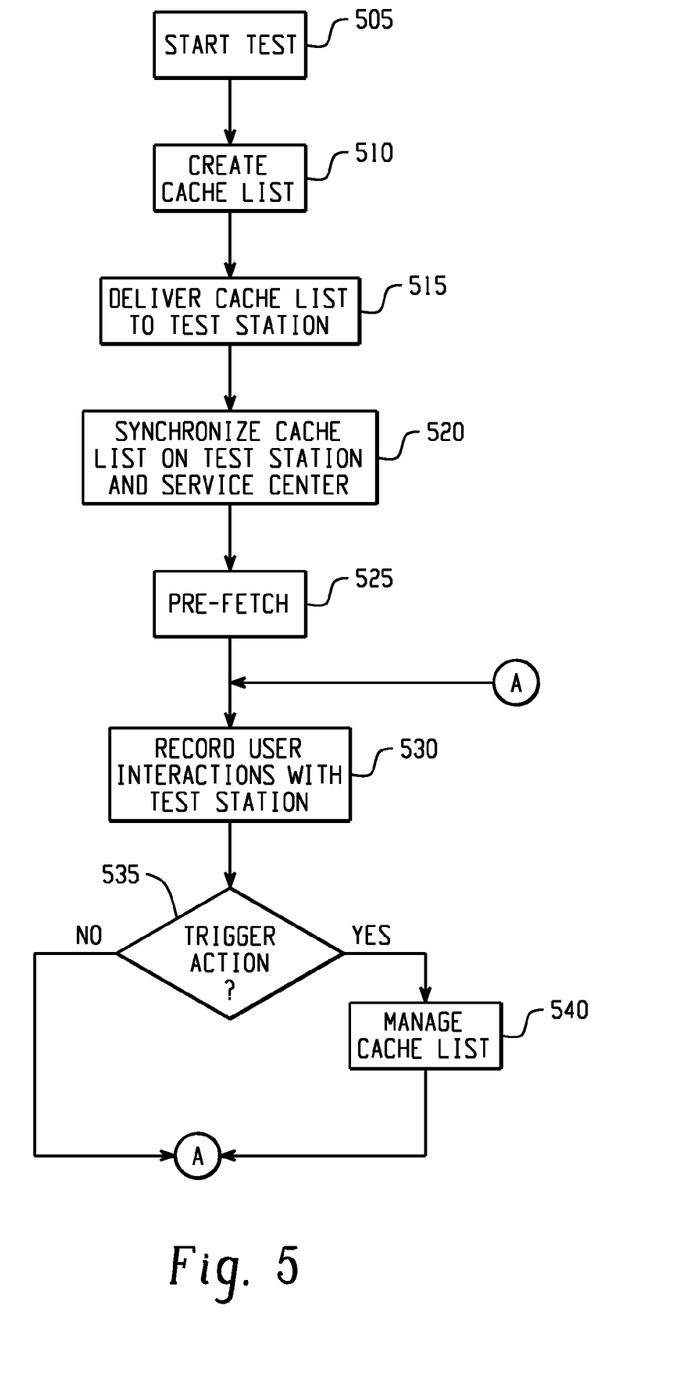
FIG. 5 illustrates a flow diagram of a method for performing caching for a test, according to an embodiment of the invention.

FIG. 5 is a diagram illustrating a method for caching the components of a test which method may be used for any examination model, including but not limited to linear tests or adaptive tests. Following the start of the test 505, the service center creates a cache list 510 of all the components which will be delivered to the testing stations in order to administer the test. In a preferred embodiment, the cache list will include any data, messages, and other information necessary to create and display the test items and any other content of the examination and record the user's responses. The cache list identifies the components which need to be delivered to the testing station, i.e., the test items. The cache list is then delivered to the testing station 515 and stored in volatile memory. The cache list on the test station and at the service center are then synchronized 520. The testing station then pre-fetches a configurable amount data 525. The amount of data pre-fetched is a cushion which the method seeks to maintain in order to avoid data latency issues. The amount of data stored as a cushion is configured according to the needs of the examination being administered and the network's bandwidth capabilities. All user interactions with the testing station are monitored and recorded 530. If a user action is a trigger action 535, the method manages/updates the cache list 540 to maintain the data cushion established in the pre-fetch step. Primarily, managing the cache list will require that additional components should be fetched from the service center. However, in order to avoid adversely effecting the performance of the testing station when then user is interacting with the testing station, the fetch will be timed to occur at times which will minimize such issues, such as periods of inactivity associated with responding to the current test item. If the user interaction recorded is not a trigger action, the system returns to monitoring user interactions.

This method may be terminated at any time when required in order to continue the orderly display of test items to the user and recording of responses to the test items. For example, if the user skips to a new test item which has not be pre-loaded on the testing station, the item caching method in progress will be terminated in order to immediately download to the testing station the components for the new test item. Once the components for that test item have been downloaded, the test caching method may be restarted.

In a preferred embodiment, components may be fetched out of order on the cache list. In this embodiment, components of test items requiring a proportionately large amount data may be fetched out of sequence of the cache list.

Item caching also requires managing the available bandwith to optimize not only item caching, but also state management. In a preferred embodiment, a portion of the bandwith is reserved for data related to state management, even during the fetch steps of the item caching. In this way, the benefits of both state management and item caching can be achieved by the system.

Figure 6:
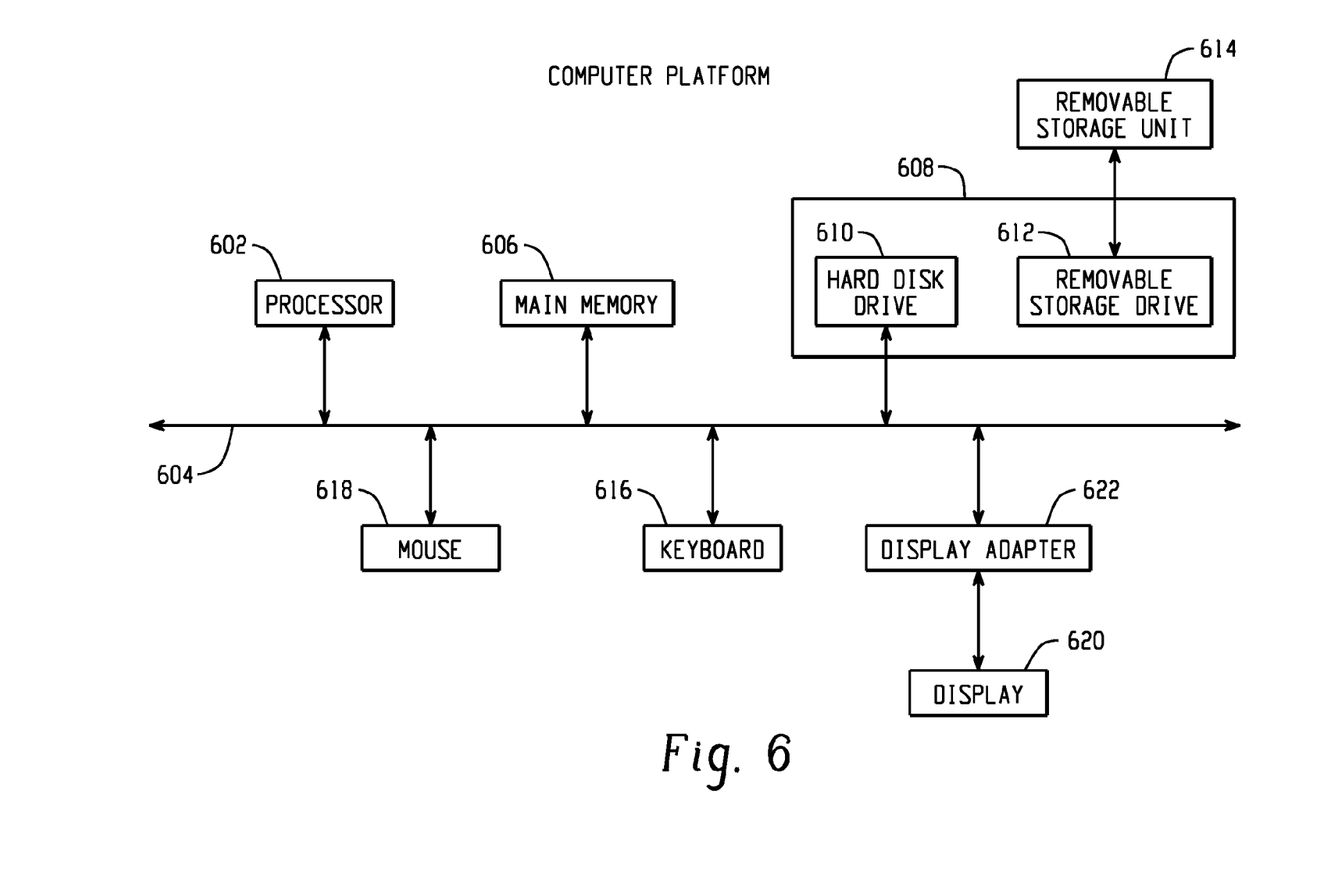
FIG. 6 illustrates an exemplary computer platform, according to an embodiment of the invention.

FIG. 6 illustrates an exemplary computer platform, according to an embodiment of the invention, for a computing device, such as a testing station, server, etc. in the system 100. The platform includes one or more processors, such as the processor 602, that provides a platform for executing testing software. Commands and data from the processor 602 are communicated over a communication bus 604. The platform 600 also includes a main memory 606, such as a Random Access Memory (RAM), where the software may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the peer privacy module may be stored. The removable storage drive 612 reads from and/or writes to a removable storage unit 614 in a well-known manner. A user may interface with the platform 600 with a keyboard 616, a mouse 618, and a display 620. The display adaptor 622 interfaces with the communication bus 604 and the display 620 and receives display data from the processor 602 and converts the display data from the processor 602 and converts the display data into display commands for the display 620.

What has been described and illustrated herein is a preferred embodiment of the invention along with some its variations. The terms, descriptions and figures used herein are set forth are way of illustration only and are not meant as limitations. Those skilled in the art will recognize that many variations are possible within the spirit and scope of the invention, which is intended to defined by the following claims—and their equivalents—in which all terms are meant in their broadest reasonable sense unless otherwise indicated.

What is claimed is:

1. A system for administering an examination to a user over a distributed network comprising:
    a testing station operated by the user configured to record state information of an examination based on user interactions with the testing station and to transmit changes to the state information upon detection of a triggering event comprising the user providing a response to at least one of a plurality of test items, wherein the testing station is further configured to transmit changes to the state information upon a heartbeat timer exceeding a threshold; and a server computer system configured to receive the changes to the state information from the testing station and to use the information to update a state object maintained on the server, wherein the server is further configured to detect expiration of a fault timer indicating closure of a testing session between the server and the testing station and to respond to a reconnection request from the user by using an initial state object and the state object stored on the server to recreate the examination on the testing station or a different testing station at a point in the examination where the testing session closed, and wherein the user will not be penalized for the time that questions are not available.

2. The system of claim 1, wherein the state information includes time elapsed from the start of the examination, identification of test items displayed to the user, and user interactions with the testing stations.

3. The system of claim 1, wherein the server computer system communicates with the testing station via a distributed network.

4. The system of claim 3, wherein the distributed network is the Internet.

5. The system of claim 1, wherein the testing station is further configured to store test items in volatile memory.

6. The system of claim 1, wherein the server computer system comprises:
one or more computers configured to perform the functions of a web server, a servlet engine and an application server; and
one or more data storage devices.

7. The system of claim 1, wherein the server computer system comprises:
one or more computers;
one or more data storage devices; and
a package migration tool configured to properly format test packages prior to delivery to the testing station.

8. The system of claim 7, wherein the package migration tool is further configured to manage use of subsequent versions of the test packages.

9. The system of claim 1, wherein the server computer system is further configured to score the responses to the test items.

10. The system of claim 1, wherein the examination is a linear examination.

11. The system of claim 1, wherein the examination is an adaptive examination.

12. A method of administering an examination to a user over a distributed network comprising:
delivering a plurality of test items from a server to a testing station as part of an examination;
creating at the server an initial state object including information relating to the examination taken at the testing station;
maintaining a state object including information relating to a state of the examination taken at the testing station;
receiving at the server a first changed state object at the same time that a triggering event occurs on the testing station, wherein the triggering event comprises the user providing a response to one of the plurality of test items, and wherein the first changed state object represents changes to the state of the examination and comprises the triggering event and other state changes since a previously received changed state object;
updating the maintained state object using the first changed state object;
receiving at the server a second changed state object when a heartbeat timer exceeds a threshold, wherein the second changed state object represents changes to the state of the examination and comprises one or more queued state changes that do not require immediate updates to the state object maintained on the server;
updating the maintained state object using the second changed state object;
initializing at the server a fault timer;
when the fault timer exceeds a threshold, recording an indication that a testing session of the examination on the test station is closed;
upon receiving a reconnection request from the user, using the initial state object and the state objects maintained on the server to recreate the examination on the testing station at the point in the examination where the testing session closed, and wherein the user will not be penalized for the time that questions are not available.

13. The method of claim 12, further comprising:
synchronizing the initial state object on the server and on one or more testing stations in communication with the server, wherein the initial state object comprises the time within which the examination must be completed and the plurality of test items to be presented to the user.

14. The method of claim 12, wherein the first changed state object further includes the time elapsed in the examination, and an identification of the test items presented to the user.

15. The method of claim 12, wherein the examination is an adaptive examination.

16. The method of claim 12, wherein the examination is a linear examination.

* * * * *